UNITED STATES PATENT OFFICE.

FRANZ O. MATTHIESSEN, OF IRVINGTON, NEW YORK.

IMPROVEMENT IN PROCESSES FOR WASHING RAW SUGAR.

Specification forming part of Letters Patent No. 191,539, dated June 5, 1877; application filed March 3, 1877.

*To all whom it may concern:*

Be it known that I, FRANZ O. MATTHIESSEN, of Irvington, New York, have invented an Improvement in the Process of Washing Raw Sugar, of which the following is a specification:

My improvement relates to the art of removing impurities from raw sugar by washing.

It has heretofore been a common practice to wash raw sugar for the purpose of removing its soluble impurities preparatory to boiling it in the vacuum-pan, and this washing has usually been performed in the centrifugal machine. In the latter case the raw sugar is mixed with a comparatively small quantity of water, so as to make it of the consistency of magma, and in this condition, when subjected to the action of the centrifugal machine, it forms a wall on the inside of the periphery of the basket, and, while in that condition, is washed by water or steam introduced into the centrifugal machine, and directed in jets toward the sugar wall. The water or steam so used is driven through the wall of sugar by centrifugal force, and carries with it the soluble impurities contained in the sugar. The water used in washing the raw sugar dissolves and carries off a portion of the sugar, thus forming a sirup, which is dark-colored by reason of the impurities it contains.

It has heretofore been the practice to treat the sirup by decolorizing and boiling, in the usual way, to extract the sugar from it.

My invention consists in using this sirup instead of pure water for the purpose of imparting the desired fluidity to the raw sugar preparatory to its introduction into the centrifugal machine, as has been described.

The sirup or washings from the raw sugar may be used over and over again—a greater or less number of times, according to the quantity of impurities contained in the sugar operated upon. Finally, when, by repeated use, the sirup has become very black and thick, I treat it by the usual processes of decolorization and boiling, to extract the sugar it contains, and recommence the washing operation with pure water, as before.

The advantage of this process of washing raw sugar is twofold: First, the sirup, having already taken up all or nearly all the sugar which it can hold in solution, does not dissolve and carry off any considerable portion of the raw sugar. Secondly, I obtain the impurities from the raw sugar in a concentrated form—that is, in a small quantity of sirup—which can be conveniently treated by the subsequent processes of decolorization and boiling.

In my process the sugar is prepared for washing in the centrifugal machine by being mixed with the sirup resulting from a previous washing or washings of raw sugar, and, being then placed in the centrifugal machine, is there washed by jets of water or steam, in the usual way, and the sirup discharged from it is collected, and can be used to mix with another lot of raw sugar. This use of the sirup is repeated so long as the sirup has sufficient fluidity to answer the desired purpose.

Of course, I may use any sugar-sirup or sugar-liquor for preparing raw sugar for washing, with a like effect as to rendering the raw sugar fluid, without dissolving any considerable portion of it.

I claim as my invention—

The improvement in the mode of removing impurities from raw sugar herein described, which consists in preparing the raw sugar for washing by mixing it with a sugar-sirup or sugar-liquor, and in then washing the prepared raw sugar in the centrifugal machine, substantially as and for the purposes set forth.

F. O. MATTHIESSEN.

Witnesses:
ISAAC ROMAINE,
W. K. ELMENHORST.